(12) United States Patent
Iwahashi (10) Patent No.: US 11,268,553 B2
(45) Date of Patent: Mar. 8, 2022

(54) MEMBER ATTACHMENT STRUCTURE

(71) Applicant: TOYODA GOSEI CO., LTD., Kiyosu (JP)

(72) Inventor: Taichi Iwahashi, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 0 days.

(21) Appl. No.: 16/950,151

(22) Filed: Nov. 17, 2020

(65) Prior Publication Data

US 2021/0148389 A1 May 20, 2021

(30) Foreign Application Priority Data

Nov. 20, 2019 (JP) .............................. JP2019-209280

(51) Int. Cl.
*F16B 5/02* (2006.01)
*B62D 65/14* (2006.01)
*B62D 27/06* (2006.01)

(52) U.S. Cl.
CPC .............. *F16B 5/02* (2013.01); *B62D 65/14* (2013.01); *B62D 27/065* (2013.01)

(58) Field of Classification Search
CPC ............ F16B 5/02; B62D 25/20–2009; B62D 27/065; B62D 65/14; B60R 13/0262
See application file for complete search history.

(56) References Cited

U.S. PATENT DOCUMENTS

| | | | | |
|---|---|---|---|---|
| 4,448,565 A | * | 5/1984 | Peterson | F16B 5/02 403/408.1 |
| 5,013,174 A | * | 5/1991 | Marabotto | F16B 5/02 403/11 |
| 6,086,143 A | * | 7/2000 | Schroeder | B62D 25/04 296/146.11 |
| 8,899,867 B2 | * | 12/2014 | Tatomir | A42B 3/228 403/168 |
| 9,463,831 B2 | * | 10/2016 | Morris | B62D 27/04 |
| 10,215,207 B2 | * | 2/2019 | Sone | F16H 61/00 |
| 10,400,813 B2 | | 9/2019 | Cloud | |
| 2009/0142157 A1 | * | 6/2009 | Wang | F16B 5/02 411/337 |

(Continued)

FOREIGN PATENT DOCUMENTS

| | | |
|---|---|---|
| JP | H07-025327 U | 5/1995 |
| JP | 2004-176897 A | 6/2004 |
| JP | 2009-036310 A | 2/2009 |

*Primary Examiner* — Matthew P Travers
(74) *Attorney, Agent, or Firm* — Posz Law Group, PLC (57) ABSTRACT

A member attachment structure, in which a second member is overlapped with the first member while a large diameter hole communicates with a part of small diameter holes, is provided. At a position of the first member where the second member is not overlapped, a male screw portion inserted into the small diameter hole and extending from the small diameter hole to the base portion side is screwed into a first boss. At a position of the first member where the second member is overlapped, a tip end portion of a second boss is inserted into the large diameter hole and brought into contact with the first member, the second member is held while being overlapped with the first member, and the male screw portion inserted into the small diameter hole and extending from the small diameter hole to the base portion side is screwed into the second boss.

3 Claims, 6 Drawing Sheets

(56) References Cited

U.S. PATENT DOCUMENTS

| | | | |
|---|---|---|---|
| 2009/0302592 A1* | 12/2009 | Landmark | B62D 27/065 280/795 |
| 2010/0322738 A1* | 12/2010 | Lau | F16B 37/125 411/17 |
| 2015/0285290 A1* | 10/2015 | Roehrl | F16B 35/005 411/82 |
| 2019/0299868 A1* | 10/2019 | Sekozawa | B60R 13/02 |

* cited by examiner

MEMBER ATTACHMENT STRUCTURE

CROSS-REFERENCE TO RELATED APPLICATION(S)

This application is based upon and claims the benefit of priority from prior Japanese patent application No. 2019-209280 filed on Nov. 20, 2019, the entire contents of which are incorporated herein by reference.

BACKGROUND

1. Field of the Invention

The present invention relates to a member attachment structure in which a member is attached to a base portion using a tap screw.

2. Description of the Related Art

There has been known an attachment structure in which a member is attached to a base portion by fastening the member to a boss protruding from a base portion using a tap screw (for example, see JP-A-2009-36310).

Figure 6:
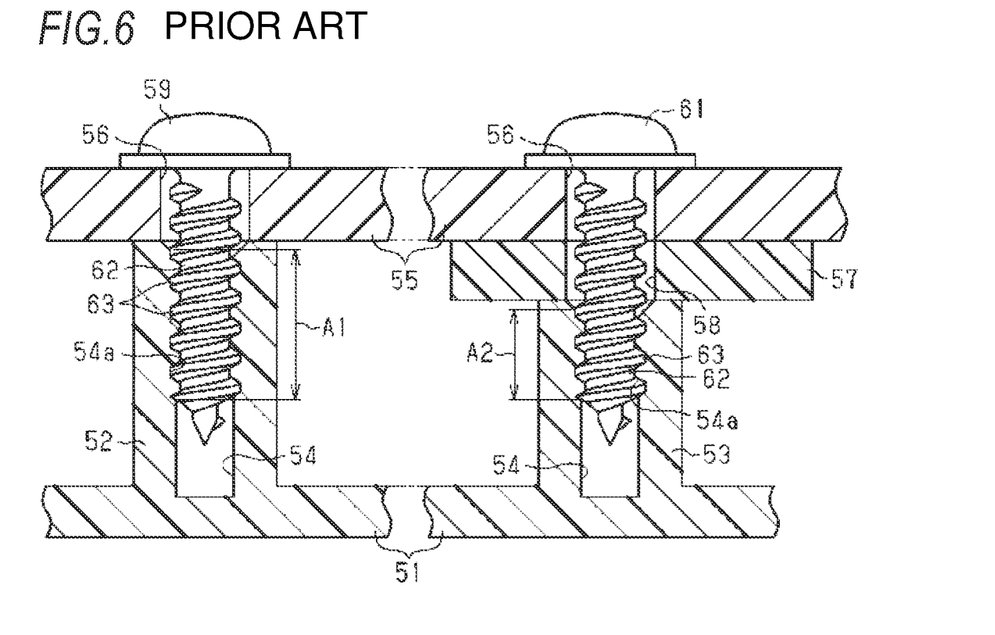
FIG. 6 is a view showing a related-art technology, and is a partial cross-sectional view corresponding to FIG. 1.

An example of the attachment structure is shown in FIG. 6. The attachment structure includes a base portion 51, and a plurality of first bosses 52 and a plurality of second bosses 53 each protruding upward from the base portion 51. Each first boss 52 and each second boss 53 both have a pilot hole 54 having an open upper end. A length of each second boss 53 protruding from the base portion 51 is shorter than a length of each first boss 52 protruding from the base portion 51.

The attachment structure further includes a first member 55 and a plurality of second members 57. Insertion holes 56 penetrating the first member 55 in a thickness direction and each having a diameter smaller than that of the first boss 52 and the second boss 53 are formed at a plurality of positions of the first member 55 corresponding to the first bosses 52 and the second bosses 53. Each second member 57 has an insertion hole 58 penetrating the second member 57 in a thickness direction and having a diameter smaller than that of the second boss 53 as the insertion hole 56 of the first member 55. Each second member 57 is arranged so as to be overlapped with a lower side that is a base portion 51 side of the first member 55 while the insertion hole 58 of the second member 57 communicates with a part of the insertion holes 56.

A tap screw 59 is used to fasten the first member 55 to the first boss 52. A tap screw 61 is used to fasten the second member 57 and a position of the first member 55 where the second member 57 is overlapped to the second boss 53. Each of the tap screws 59, 61 includes a shaft portion 62 having a male screw portion 63 formed on an outer circumference thereof.

At a position of the first member 55 where the second member 57 is not overlapped, the shaft portion 62 of the tap screw 59 is inserted into the insertion hole 56. The male screw portion 63 extending downward from the insertion hole 56 to the base portion 51 side is screwed into the first boss 52. Along with this screwing, the male screw portion 63 is screwed into a female screw portion 54a formed in the pilot hole 54 of the first boss 52. By this screwing, the position of the first member 55 where the second member 57 is not overlapped is fastened to the first boss 52, whereby the position is attached to the base portion 51 via the first boss 52.

At the position of the first member 55 where the second member 57 is overlapped, a tip end surface of the second boss 53 is in contact with a circumferential portion of the insertion hole 58, in a lower surface of the second member 57 on the base portion 51 side. The shaft portion 62 of the tap screw 61 is inserted into both the insertion holes 56, 58. The male screw portion 63 extending downward from the insertion hole 58 to the base portion 51 side is screwed into the second boss 53. Along with this screwing, the male screw portion 63 is screwed into the female screw portion 54a formed in the pilot hole 54 of the second boss 53. By this screwing, the second member 57 and the position of the first member 55 where the second member 57 is overlapped are fastened to the second boss 53, whereby the first member 55 and the second member 57 are attached to the base portion 51 via the second boss 53.

In the related-art attachment structure, the second boss 53 is shorter than the first boss 52. A length A2 at which the tap screw 61 inserted into the first member 55 and the second member 57 is screwed into the second boss 53 is shorter than a length A1 at which the tap screw 59 inserted only into the first member 55 is screwed into the first boss 52. As a result, a fastening force of the tap screw 61 fastening the position of the first member 55 where the second member 57 is overlapped to the second boss 53 is smaller than a fastening force of the tap screw 59 fastening the position of the first member 55 where the second member 57 is not overlapped to the first boss 52. In this way, the related-art attachment structure has a problem that there is a difference in the fastening force between the position where the second member 57 is not overlapped and the position where the second member 57 is overlapped.

Such a problem may occur in the same manner as described above when a member formed by integrally forming the first member 55 and the second members 57 is attached to the base portion 51 via the first bosses 52 and the second bosses 53. The member in this case includes a thin-walled portion having a small thickness in the first member 55 where the second member 57 is not overlapped, and a thick-walled portion having a large thickness in the first member 55 where the second member 57 is overlapped. The thin-walled portion is attached to the base portion via the first boss, and the thick-walled portion is attached to the base portion via the second boss.

The present invention has been made in view of the above circumstances, and an object thereof is to provide a member attachment structure capable of fastening a member to all bosses with a uniform fastening force when the member is attached to a base portion.

SUMMARY

According to an aspect of the present invention, there is provided a member attachment structure in which a first member having a plurality of small diameter holes penetrating in a thickness direction and a second member having a large diameter hole whose diameter is larger than that of the small diameter hole are used as a member to be attached, and the member is attached to a base portion using a tap screw having a male screw portion formed on an outer circumference of a shaft portion, where: the second member is overlapped with the first member from a base portion side in the thickness direction while the large diameter hole communicates with a part of the small diameter holes; a first boss and a second boss having a same length protrude toward the first member from the base portion; at a position of the first member where the second member is not overlapped, the male screw portion inserted into the small diameter hole and extending from the small diameter hole to the base portion side is screwed into the first boss; and at a position of the first member where the second member is overlapped, a tip end portion of the second boss is inserted into the large diameter hole and brought into contact with the first member, and by a holding member arranged around the second boss and between the second member and the base portion, the second member is held while being overlapped with the first member, and further, the male screw portion inserted into the small diameter hole and extending from the small diameter hole to the base portion side is screwed into the second boss.

According to the above configuration, when the first member and the second members are attached to the base portion, the holding member is mounted on second boss. Each second member is placed on the corresponding holding member such that the tip end portion of each second boss protruding from the holding member enters each large diameter hole. The first member is placed on the first boss, on the second boss and on the second member such that a part of the small diameter holes each communicates with a pilot hole of the first boss and other small diameter holes each communicates with a pilot hole of the second boss. Then, the tip end portion of each second boss comes into contact with the first member, and the first member overlaps on the second member.

At the position of the first member where the second member is not overlapped, the shaft portion of the tap screw is inserted into the small diameter hole. The male screw portion extending from the small diameter hole to the base portion side is screwed into the first boss. The position of the first member where the second member is not overlapped is fastened to the first boss, whereby the position is attached to the base portion via the first boss.

At the position of the first member where the second member is overlapped, the shaft portion of the tap screw is inserted into the small diameter hole. The male screw portion extending from the small diameter hole to the base portion side is screwed into the second boss. At the second member and the position of the first member where the second member is overlapped, the first member is fastened to the second boss, whereby the position is attached to the base portion via the second boss. The second member is sandwiched from both sides in the thickness direction by the first member and the holding member, and is indirectly attached to the base portion via the second boss by the tap screw.

Here, lengths of the first boss and the second boss protruding from the base portion are the same. Therefore, a length at which the tap screw is screwed into the first boss and a length at which the tap screw is screwed into the second boss are the same or substantially the same provided that one having the same standard is used as the tap screw. Therefore, a fastening force of the tap screw fastening the first member to the first boss and a fastening force of the tap screw fastening the first member to the second boss can be made uniform.

In the member attachment structure, it is preferable that the holding member has an annular shape and is fitted to the second boss.

According to the above configuration, since the annular holding member is in contact with the second member over the entire circumference around the second boss, the second member is held in a well-balanced state in contact with the first member by the holding member at any position in a circumferential direction of the second boss.

According to another aspect of the present invention, there is provided a member attachment structure in which a member formed by a thin-walled portion having a small diameter hole penetrating a thickness direction and a thick-walled portion having a portion extending toward a base portion side and thicker than the thin-walled portion is used as a member to be attached, and the member is attached to a base portion using a tap screw having a male screw portion formed on an outer circumference of a shaft portion, where: the small diameter hole is formed in the thick-walled portion while being open on a surface far from the base portion; in the portion of the thick-walled portion extending toward the base portion side and thicker than the thin-walled portion, a large diameter hole whose diameter is larger than that of the small diameter hole is formed while being open on a surface close to the base portion, and the small diameter hole and the large diameter hole in the thick-walled portion communicate with each other via a stepped surface; a first boss and a second boss having a same length protrude toward the member from the base portion; in the thin-walled portion, the male screw portion inserted into the small diameter hole and extending from the small diameter hole to the base portion side is screwed into the first boss; and in the thick-walled portion, a tip end portion of the second boss is inserted into the large diameter hole and brought into contact with the stepped surface, and the male screw portion inserted into the small diameter hole of the thick-walled portion and extending from the small diameter hole to the base portion side is screwed into the second boss.

According to the above configuration, when the member having the thin-walled portion and the thick-walled portion is attached to the base portion, the member is moved toward the base portion and brought close to the first boss and the second boss such that the large diameter hole in the thick-walled portion communicates with a pilot hole of the second boss. During this movement, the tip end portion of the second boss having a length the same as that of the first boss is inserted into the large diameter hole. The thin-walled portion is brought close to the first boss such that the small diameter hole in the thin-walled portion communicates with a pilot hole of the first boss. When the second boss is inserted into the large diameter hole up to a position where the tip end portion of the second boss comes into contact with the stepped surface, a base portion side surface of the thin-walled portion comes into contact with the tip end portion of the first boss. The member is placed on the first boss and on the second boss.

Subsequently, the shaft portion of the tap screw is inserted into the small diameter hole of the thin-walled portion. When the male screw portion extending from the small diameter hole toward the base portion side is screwed into the first boss, the thin-walled portion is fastened to the first boss. The thin-walled portion is attached to the base portion via the first boss.

The shaft portion of the tap screw is inserted into the small diameter hole of the thick-walled portion. When the male screw portion extending from the small diameter hole toward the base portion side is screwed into the second boss, the thick-walled portion is fastened to the second boss. The thick-walled portion is attached to the base portion via the second boss.

Here, lengths of the first boss and the second boss protruding from the base portion are the same. Therefore, a length at which the tap screw is screwed into the first boss and a length at which the tap screw is screwed into the second boss are the same or substantially the same provided that one having the same standard is used as the tap screw.

Therefore, a fastening force of the tap screw fastening the thin-walled portion to the first boss and a fastening force of the tap screw fastening the thick-walled portion to the second boss can be made uniform.

In the member attachment structure, it is preferable that the tip end portion of the second boss is fitted to the large diameter hole.

According to the above configurations, when the tip end portion of the second boss is inserted into the large diameter portion of the second member or the large diameter hole of the thick-walled portion, a gap is fairly small between an outer circumferential surface of the tip end portion and an inner wall surface of the large diameter hole. The second member having the large diameter hole or the member having the large diameter hole is positioned in a radial direction of the second boss.

According to the member attachment structure, when the member is attached to the base portion, the member can be fastened to all bosses with a uniform fastening force.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

First Embodiment

Hereinafter, a member attachment structure according to a first embodiment will be described with reference to FIGS. 1 to 3.

Figure 2:
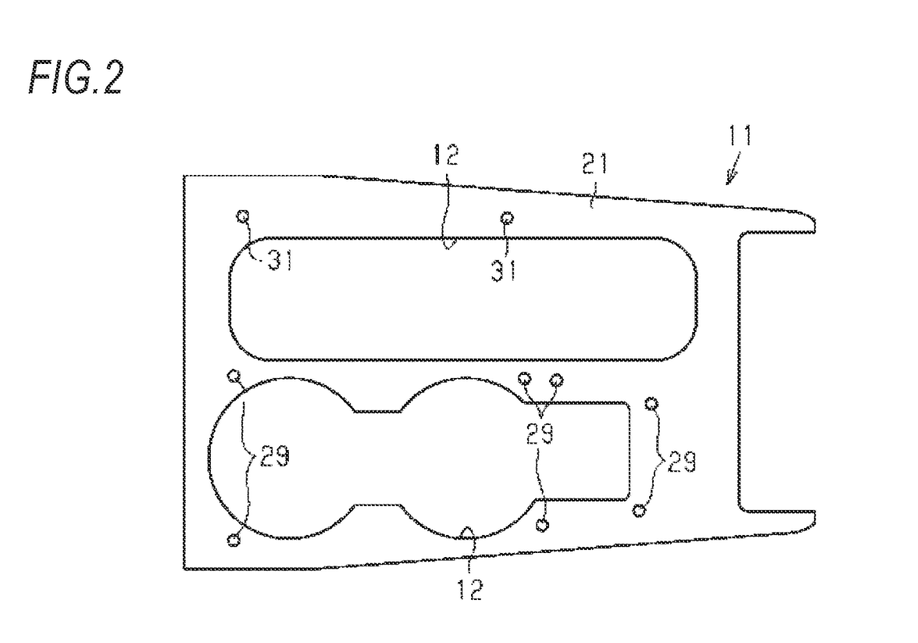
FIG. 2 is a view showing the first embodiment, and is a plan view of a floor console to which an attachment structure is applied.

A floor console 11 shown in FIG. 2 is arranged between a driver seat and a passenger seat in a vehicle such as an automobile, and is attached to a floor (a floor panel) of the vehicle. Various holes 12 for inserting a shift lever, a side brake lever and the like and incorporating a cup holder are provided in an upper portion of the floor console 11.

Figure 1:
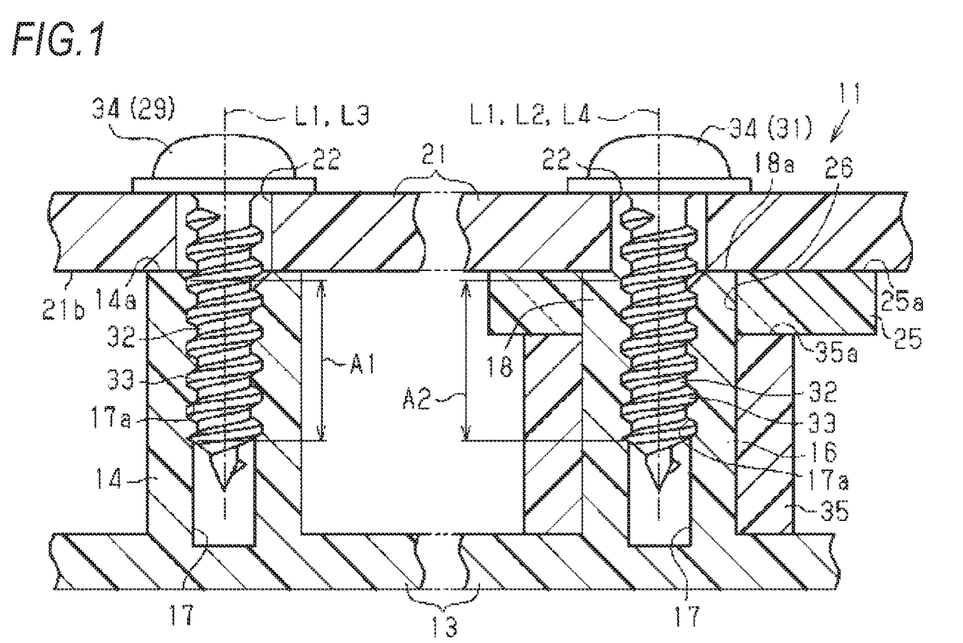
FIG. 1 is a partial cross-sectional view showing a state in which a first member is attached to a base portion via a first boss, and both the first and second members are attached to the base portion via a second boss according to the first embodiment.
Figure 3:
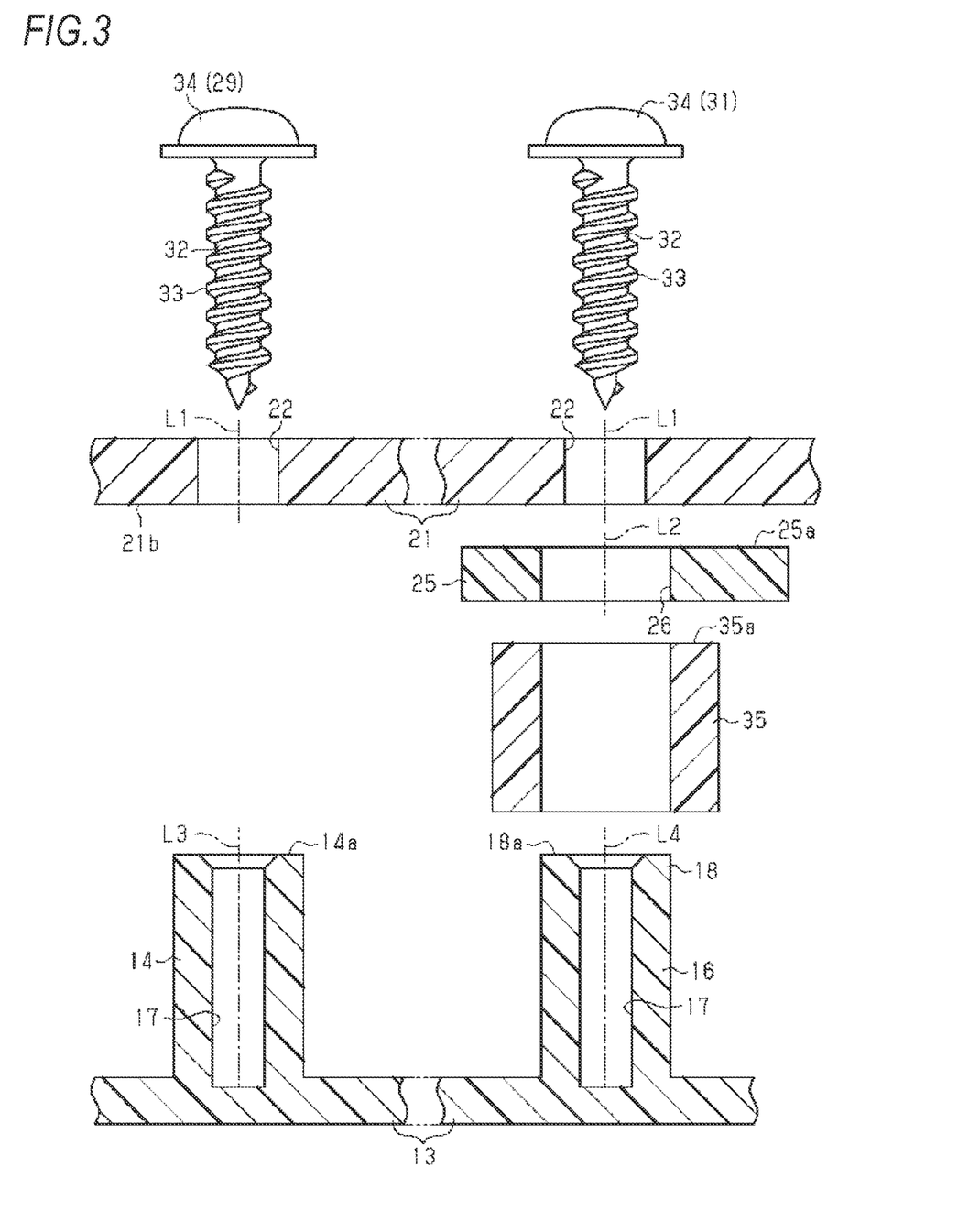
FIG. 3 is a partially exploded cross-sectional view of FIG. 1.

As shown in FIGS. 1 and 3, the floor console 11 includes a flat-plate-shaped base portion 13 extending in a horizontal direction and a plurality of first bosses 14 and a plurality of second bosses 16 protruding upward from the base portion 13 in parallel to each other. The first bosses 14 and the second bosses 16 are arranged around the holes 12. Each first boss 14 and each second boss 16 have a shape and a size the same as each other. Specifically, each first boss 14 and each second boss 16 both have a cylindrical shape, and have a pilot hole 17 having an open upper end and a closed lower end. Each first boss 14 and each second boss 16 are the same in a length (a height) thereof protruding from the base portion 13 and an outer diameter thereof, and an inner diameter of the pilot hole 17. The base portion 13, the plurality of first bosses 14 and the plurality of second bosses 16 are integrally formed of a resin material.

The floor console 11 further includes a single first member 21 and a plurality of second members 25, which are formed of, for example, a resin material. In the first member 21, small diameter holes 22 penetrating the first member 21 in a thickness direction are formed at a plurality of positions corresponding to the first bosses 14 and the second bosses 16. Each small diameter hole 22 is formed of a round hole having the same inner diameter at any position in the thickness direction. The inner diameter of the small diameter hole 22 is smaller than the outer diameter of the first boss 14 and the second boss 16. The first member 21 is placed on the first bosses 14 and the second bosses 16 in a state in which an axis L1 of a part of the small diameter holes 22 is aligned with an axis L3 of the first boss 14, and the axis L1 of the remaining small diameter holes 22 is aligned with an axis L4 of the second boss 16.

Here, the thickness direction of the first member 21 and each second member 25 coincides with an upper-lower direction in the first embodiment. Therefore, in the following description, the thickness direction of the first member 21 and the second member 25 is referred to as the "upper-lower direction", and an upper side in the thickness direction is simply referred to as "upward", "upper side", "above" or the like, and a lower side in the thickness direction is simply referred to as "downward", "lower side", "below" or the like. The same applies to a thickness direction of a member 43 in a second embodiment described later.

Each second member 25 has a large diameter hole 26 penetrating the second member 25 in the upper-lower direction. The large diameter hole 26 in each second member 25 is formed of a round hole having the same inner diameter at any position in the upper-lower direction. The inner diameter of the large diameter hole 26 in each second member 25 is set to be larger than the inner diameter of the small diameter hole 22 and to a size such that the second boss 16 can be fitted thereto. That is, the inner diameter of the large diameter hole 26 in each second member 25 is set to be slightly larger than the outer diameter of the second boss 16. Each second member 25 is arranged so as to be overlapped on a lower side that is a base portion 13 side of the first member 21 in a state in which an axis L2 of the large diameter hole 26 is aligned with the axis L1 of a part of the small diameter holes 22, that is, in a state of communicating with the small diameter hole 22.

A tap screw 29 is used to fasten the first member 21 to the first boss 14. A tap screw 31 is used to fasten the first member 21 and the second member 25 to the second boss 16. As the tap screws 29, 31, those having the same standard are used. Each of the tap screws 29, 31 includes a shaft portion 32 having a male screw portion 33 formed on an outer circumference thereof, and a head portion 34 formed at a base end portion (an upper end portion in FIG. 1) of the shaft portion 32. An outer diameter of the male screw portion 33 is smaller than the inner diameter of the small diameter hole 22. At a position of the first member 21 where the second member 25 is not overlapped, the shaft portion 32 of the tap screw 29 is inserted into the small diameter hole 22. The male screw portion 33 extending downward from the small diameter hole 22 to the base portion 13 side is screwed into the first boss 14.

At a position of the first member 21 where the second member 25 is overlapped, a tip end portion 18 of the second boss 16 is fitted to the large diameter hole 26. A tip end surface 18a of the second boss 16 is in contact with a circumferential portion of the small diameter hole 22, in a lower surface 21b of the first member 21.

An annular holding member 35 is arranged around each second boss 16 and between each second member 25 and the base portion 13. In the first embodiment, each holding member 35 has a cylindrical shape extending in the upper-lower direction and having open both upper and lower end portions, and is fitted to each second boss 16 from outside. In the first embodiment, each holding member 35 is formed of a resin material. An upper end surface 35a of each holding member 35 is located at a position lower than the tip end surface 18a of the second boss 16 by a thickness of the second member 25. Each second member 25 is held by each holding member 35 while being overlapped with the first member 21.

Further, the shaft portion 32 of the tap screw 31 is inserted into the small diameter hole 22.

The male screw portion 33 extending downward from the small diameter hole 22 to the base portion 13 side is screwed into the second boss 16. Next, an action of the first embodiment configured as described above will be described. In addition, effects caused by the action will also be described.

The first member 21 and the second members 25 are attached to the base portion 13 in the following manner.

First, the holding member 35 is mounted on each second boss 16. The mounting is performed by fitting each holding member 35 to the second boss 16 from above. When each holding member 35 is mounted, the tip end portion 18 of each second boss 16 protrudes upward from the holding member 35. The tip end surface 18a of each second boss 16 is located higher than the upper end surface 35a of the holding member 35 by the thickness of the second member 25. As described above, the tip end surface 18a of each second boss 16 is located at a position separated upward from the base portion 13 by a distance the same as that of a tip end surface 14a of each first boss 14.

Next, each second member 25 is placed on the corresponding holding member 35 such that the tip end portion 18 of each second boss 16 protruding upward from the holding member 35 enters the large diameter hole 26. The holding member 35 supports the second member 25 from below such that an upper surface 25a of each second member 25 is located at a position separated upward from the base portion 13 by a distance the same as that of the tip end surface 18a of each second boss 16, and holds the second member 25 at that height.

Subsequently, the first member 21 is placed on the first bosses 14, the second bosses 16 and the second members 25 so as to be parallel to the base portion 13 such that a part of the small diameter holes 22 communicates with the pilot holes 17 of the first bosses 14 and the remaining small diameter holes 22 communicate with the pilot holes 17 of the second bosses 16. The tip end surface 18a of each second boss 16 is in contact with the circumferential portion of the small diameter hole 22 in the lower surface 21b of the first member 21. The first member 21 is in a state of overlapping on each second member 25.

At the position of the first member 21 where the second member 25 is not overlapped, the shaft portion 32 of the tap screw 29 is inserted into the small diameter hole 22. The tap screw 29 is rotated by a tool (not shown) such as an electric screwdriver while a tip end portion of the shaft portion 32 enters an upper portion of the pilot hole 17 of the first boss 14. Along with this rotation, the male screw portion 33 extending downward from the small diameter hole 22 is screwed into the first boss 14. That is, the male screw portion 33 is screwed into the female screw portion 17a while forming the female screw portion 17a in pilot hole 17 of the first boss 14. In this way, the position of the first member 21 where the second member 25 is not overlapped is fastened to the first boss 14, whereby the position is attached to the base portion 13 via the first boss 14.

At the position of the first member 21 where the second member 25 is overlapped, the shaft portion 32 of the tap screw 31 is inserted into the small diameter hole 22. The tap screw 31 is rotated by a tool (not shown) such as an electric screwdriver while the tip end portion of the shaft portion 32 enters the upper portion of the pilot hole 17 of the second boss 16. Along with this rotation, the male screw portion 33 extending downward from the small diameter hole 22 is screwed into the second boss 16. That is, the male screw portion 33 is screwed into the female screw portion 17a while forming the female screw portion 17a in the pilot hole 17 of the second boss 16. In this way, the position of the first member 21 where the second member 25 is overlapped is fastened to the second boss 16, whereby the position is attached to the base portion 13 via the second boss 16.

Each second member 25 is sandwiched from both sides in the upper-lower direction by the first member 21 and each holding member 35, and is indirectly attached to the base portion 13 via the second boss 16 by the tap screw 31.

Here, the lengths of the first boss 14 and the second boss 16 protruding from the base portion 13 are the same. In this respect, the first embodiment differs from the prior art in which the second boss 53 is shorter than the first boss 52. Therefore, a length A1 at which the tap screw 29 is screwed into the first boss 14 and a length A2 at which the tap screw 31 is screwed into the second boss 16 are the same or substantially the same. Therefore, a fastening force of the tap screw 29 fastening the position of the first member 21 where the second member 25 is not overlapped to the first boss 14 and a fastening force of the tap screw 31 fastening the position of the first member 21 where the second member 25 is overlapped to the second boss 16 can be made uniform.

As a result, it is possible to solve the problem caused by a difference in the fastening force between the position of the first member 21 where the second member 25 is not overlapped and the position of the first member 21 where the second member 25 is overlapped. For example, two types of electric drills having different fastening force need not be prepared. When work is performed with one type of electric drill, the work of switching a fastening torque is not required. In addition, it is possible to prevent insufficient fastening or excessive fastening of the tap screws 29, 31 on one of the position of the first member 21 where the second member 25 is not overlapped and the position of the first member 21 where the second member 25 is overlapped. The work of attaching the first member 21 and the second members 25 to the base portion 13 via the first bosses 14 and the second bosses 16 is simplified, and workability is improved.

According to the first embodiment, the following effects can be obtained in addition to the above.

Each holding member 35 has an annular shape and is fitted to the second boss 16. Therefore, the upper end surface 35a of each holding member 35 can be brought into contact with the second member 25 over the entire circumference around each second boss 16. The second member 25 can be held in a well-balanced state in contact with the first member 21 by the holding member 35 at any position in a circumferential direction of the second boss 16.

Since each holding member 35 has the annular shape, the holding member 35 can be mounted on the second boss 16. In addition, each holding member 35 can be easily positioned in a radial direction of the second boss 16 by merely fitting each holding member 35 to the second boss 16.

The tip end portion 18 of each second boss 16 is fitted to the large diameter hole 26 of the second member 25. Therefore, a gap is fairly small between an outer circumferential surface of the tip end portion 18 and an inner wall surface of the large diameter hole 26 in the second member 25.

Therefore, it is possible to mount the second member 25 on the tip end portion 18 while positioning the second member 25 in the radial direction of the second boss 16 by merely inserting the tip end portion 18 into the large diameter hole 26.

Second Embodiment

Figure 4:
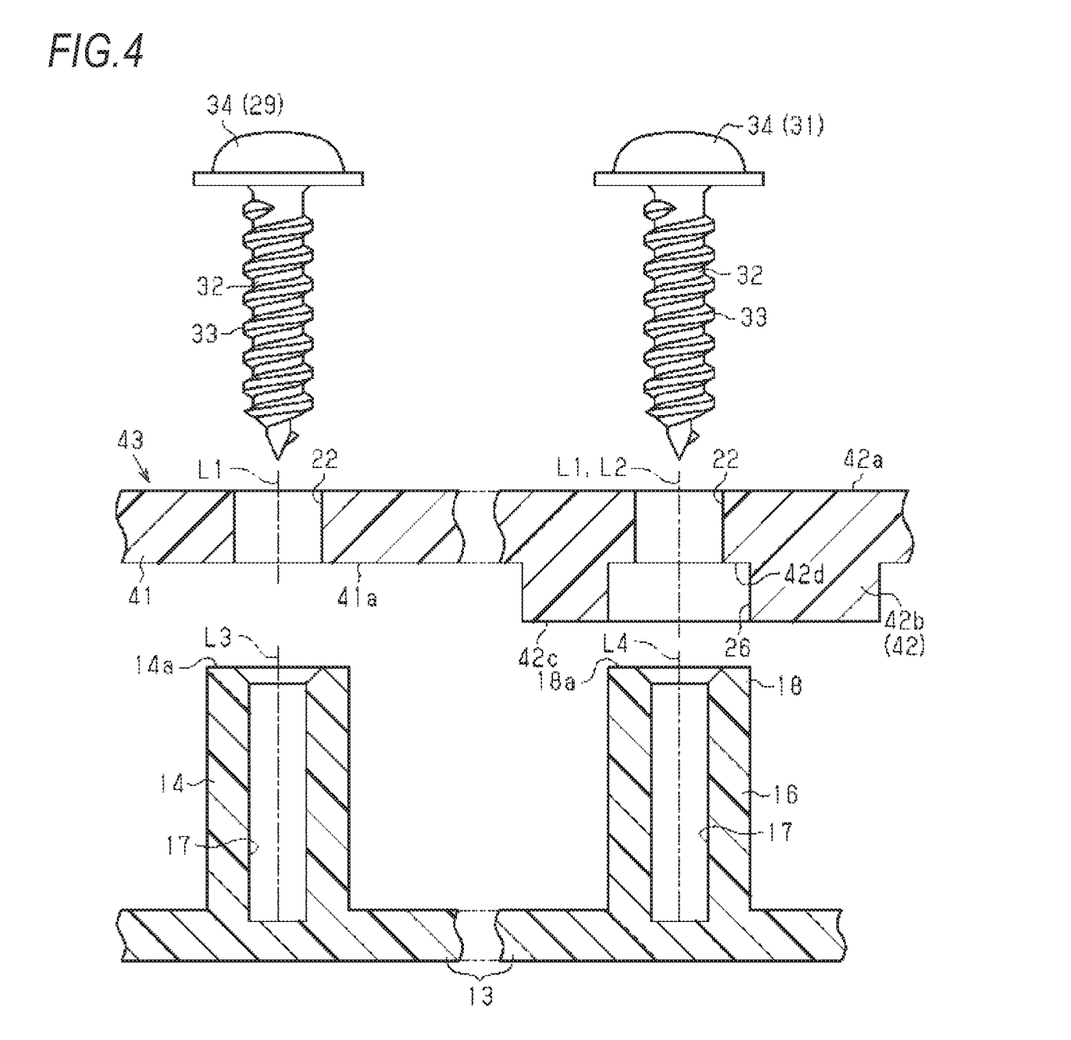
FIG. 4 is a view showing a second embodiment, and is a partially exploded cross-sectional view corresponding to FIG. 3.
Figure 5:
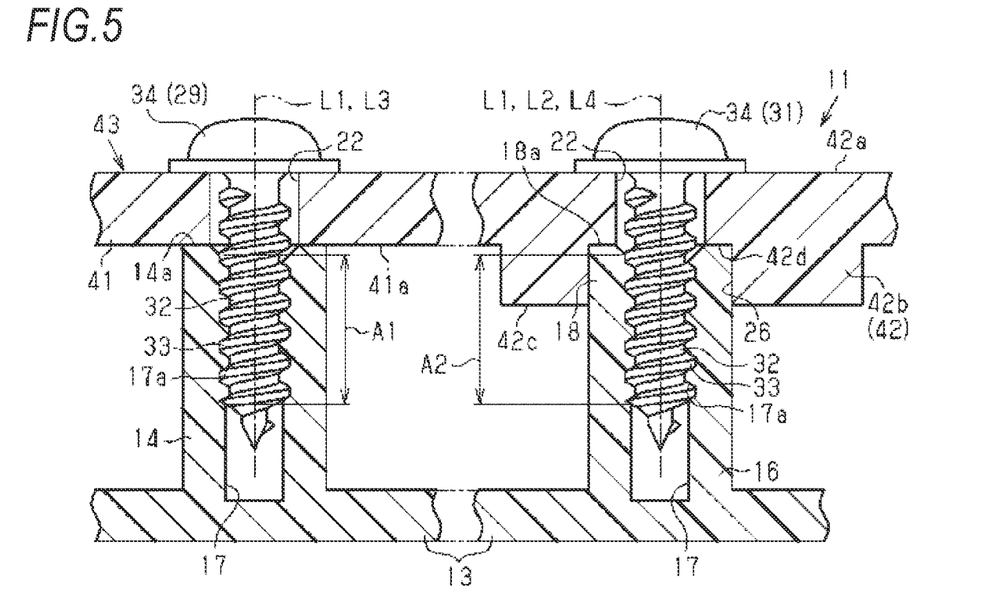
FIG. 5 is a view showing the second embodiment, and is a partial cross-sectional view corresponding to FIG. 1.

Next, a member attachment structure according to the second embodiment will be described with reference to FIGS. 4 and 5. In the second embodiment, a member 43 formed by a plurality of thin-walled portions 41 and a plurality of thick-walled portions 42 each having a portion 42b extending downward to a base portion 13 side and thicker than the thin-walled portion 41, is used as a member to be attached to the base portion 13.

The member 43 has a configuration similar to that in which the second member 25 is formed integrally with the first member 21 according to the first embodiment. In the first embodiment, the position of the first member 21 where the second member 25 is not overlapped corresponds to the thin-walled portion 41, and the position of the first member 21 where the second member 25 is overlapped corresponds to the thick-walled portion 42.

The small diameter hole 22 penetrates each thin-walled portion 41 in an upper-lower direction. The small diameter hole 22 and the large diameter hole 26 are formed in each thick-walled portion 42. The small diameter hole 22 in each thick-walled portion 42 extends in the upper-lower direction, and is open on an upper surface 42a, which is a surface far from the base portion 13. The large diameter hole 26 in each thick-walled portion 42 extends in the upper-lower direction, and is formed in the portion 42b of the thick-walled portion 42. The large diameter hole 26 in each thick-walled portion 42 is located below the small diameter hole 22, and is open on a lower surface 42c, which is a surface of the thick-walled portion 42 close to the base portion 13. The axis L1 of the small diameter hole 22 coincides with the axis L2 of the large diameter hole 26. The small diameter hole 22 and the large diameter hole 26 in each thick-walled portion 42 communicate with each other via a stepped surface 42d provided therebetween. The stepped surface 42d is provided horizontally around a lower end of the small diameter hole 22, and has an annular shape.

The tap screw 29 is used to fasten the thin-walled portion 41 to the first boss 14, and the tap screw 31 is used to fasten the thick-walled portion 42 to the second boss 16. As the tap screws 29, 31, those having the same standard as those of the first embodiment are used.

The position, shape, size, length, diameter of each pilot hole 17 and the like at the base portion 13 of each first boss 14 and each second boss 16 are the same as those according to the first embodiment. In addition, the position, shape, inner diameter, length and the like of each small diameter hole 22 in the member 43 are the same as the position, shape, inner diameter, length and the like of each small diameter hole 22 in the first member 21 according to the first embodiment. Further, the shape, inner diameter, length and the like of the large diameter hole 26 in the member 43 are the same as the shape, inner diameter, length and the like of the large diameter hole 26 in the second member 25 according to the first embodiment.

In the second embodiment, the holding member 35 is not used.

The shaft portion 32 of the tap screw 29 is inserted into the small diameter hole 22 of the thin-walled portion 41. The male screw portion 33 extending downward from the small diameter hole 22 to the base portion 13 side is screwed into the first boss 14.

The tip end portion 18 of the second boss 16 is fitted to the large diameter hole 26. The tip end surface 18a of the tip end portion 18 is in contact with the stepped surface 42d. The shaft portion 32 of the tap screw 31 is inserted into the small-diameter hole 22 of the thick-walled portion 42. The male screw portion 33 extending downward from the small diameter hole 22 to the base portion 13 side is screwed into the second boss 16.

Other configurations are the same as those of the first embodiment. Therefore, the same elements as those described in the first embodiment are denoted by the same reference numerals, and repetitive description thereof will be omitted.

Next, an action of the second embodiment configured as described above will be described. In addition, effects caused by the action will also be described.

The member 43 is attached to the base portion 13 in the following manner.

First, rough positioning is performed above each first boss 14 and each second boss 16 such that the large diameter hole 26 in each thick-walled portion 42 communicates with the pilot hole 17 of the corresponding second boss 16. When the member 43 is lowered in this state, the tip end portion 18 of each second boss 16 having the length same as that of the first boss 14 starts to be fitted into the corresponding large diameter hole 26 during the lowering. The small diameter hole 22 in each thin-walled portion 41 approaches the first boss 14. When the second boss 16 is fitted into the large diameter hole 26 up to a position where the tip end surface 18a of each second boss 16 comes into contact with the stepped surface 42d, a lower surface 41a of the thin-walled portion 41 comes into contact with the tip end surface 14a of the first boss 14. The small diameter hole 22 in the thin-walled portion 41 communicates with the pilot hole 17 of the first boss 14, and the member 43 is placed on the first bosses 14 and the second bosses 16 so as to be parallel to the base portion 13.

Subsequently, the shaft portion 32 of the tap screw 29 is inserted into the small diameter hole 22 of the thin-walled portion 41. The tap screw 29 is rotated by a tool (not shown) such as an electric screwdriver while a tip end portion of the male screw portion 33 enters an upper portion of the pilot hole 17 of the first boss 14. Along with this rotation, the male screw portion 33 extending downward from the small diameter hole 22 to the base portion 13 side is screwed into the first boss 14. That is, the male screw portion 33 is screwed into the female screw portion 17a while forming the female screw portion 17a in pilot hole 17 of the first boss 14. In this way, each thin-walled portion 41 is attached to the base portion 13 via the first boss 14 by fastening the thin-walled portion 41 to the first boss 14.

The shaft portion 32 of the tap screw 31 is inserted into the small diameter hole 22 of the thick-walled portion 42. The tap screw 31 is rotated by a tool (not shown) such as an electric screwdriver while the tip end portion of the male screw portion 33 enters the upper portion of the pilot hole 17 of the second boss 16. Along with this rotation, the male screw portion 33 extending downward from the small diameter hole 22 to the base portion 13 side is screwed into the second boss 16. That is, the male screw portion 33 is screwed into the female screw portion 17a while forming the female screw portion 17a in the pilot hole 17 of the second boss 16. In this way, each thick-walled portion 42 is attached to the base portion 13 via the second boss 16 by fastening the thick-walled portion 42 to the second boss 16.

Also in the second embodiment, the lengths of the first boss 14 and the second boss 16 protruding from the base portion 13 are the same. The length A1 at which the tap screw 29 is screwed into the first boss 14 and the length A2 at which the tap screw 31 is screwed into the second boss 16 are the same or substantially the same. Therefore, a fastening force of the tap screw 29 fastening the thin-walled portion 41 to the first boss 14 and a fastening force of the tap screw 31 fastening the thick-walled portion 42 to the second boss 16 can be made uniform. As a result, it is possible to solve various problems caused by a difference in the fastening force between the thin-walled portion 41 and the thick-walled portion 42.

According to the second embodiment, the following effects can be obtained in addition to the above.

The member 43 according to the second embodiment has a configuration similar to that in which the second member 25 is formed integrally with the first member 21 according to the first embodiment. Therefore, different from the first embodiment, it is not necessary to hold each second member 25 in contact with the first member 21. The holding member 35 that holds a portion corresponding to the second member 25 according to the first embodiment, that is, the portion 42b of the thick-walled portion 42 extending downward and having a thickness larger than that of the thin-walled portion 41, is not required.

The tip end portion 18 of each second boss 16 is fitted to the large diameter hole 26 of the thick-walled portion 42. Therefore, a gap is fairly small between an outer circumferential surface of the tip end portion 18 and an inner wall surface of the large diameter hole 26 in the thick-walled portion 42.

Therefore, it is possible to mount the member 43 on the tip end portion 18 while positioning the thick-walled portion 42 in the radial direction of the second boss 16 by merely inserting the tip end portion 18 into the large diameter hole 26.

The above embodiment can also be implemented as modifications modified as follows. The above embodiment and the following modifications can be implemented in combination with each other as long as they do not have technical contradiction.

The number of the small diameter holes 22 according to the first embodiment can be changed provided that it is two or more. The number of the large diameter holes 26 can be changed provided that it is one or more.

The small diameter hole 22 and the large diameter hole 26 may be formed by holes having a shape different from that of the round hole.

The member attachment structure in each of the above embodiments can also be applied to a case where the first bosses 14 and the second bosses 16 protrude from the base portion 13 in a direction different from upward, for example, downward, in the horizontal direction or the like.

At least one of the first boss 14 and the second boss 16 may be formed in a columnar shape different from the cylindrical shape, for example, a polygonal columnar shape. In the first embodiment, when the second boss 16 is formed in a columnar shape different from the cylindrical shape, it is preferable that a shape of the holding member 35 is also changed to a shape to be fitted to the second boss 16.

At least one of the first boss 14 and the second boss 16 may be formed of a member different from the base portion 13.

The tip end portion 18 of the second boss 16 may be inserted into the large diameter hole 26 in a non-fitted state.

Each holding member 35 may be mounted on the second boss 16 in a non-fitted state.

As the base portion 13, the first boss 14, the second boss 16, the first member 21, the second member 25, the holding member 35 and the member 43, those formed of a material different from the resin material may be used.

What is claimed is:

1. A member attachment structure in which a first member having a plurality of small diameter holes penetrating in a thickness direction and a second member having a large diameter hole whose diameter is larger than that of the small diameter holes are used as a member to be attached, and the member to be attached is attached to a base portion using tap screws each having a male screw portion formed on an outer circumference of a shaft portion, wherein:

the second member is overlapped with the first member from a base portion side in the thickness direction while the large diameter hole communicates with a part of the small diameter holes;

a first boss and a second boss having a same length protrude toward the first member from the base portion;

at a position of the first member where the second member is not overlapped, a first male screw portion inserted into a first of the small diameter holes and extending from the first small diameter hole to the base portion side is screwed into the first boss; and at a position of the first member where the second member is overlapped, a tip end portion of the second boss is inserted into the large diameter hole and brought into contact with the first member, and by a holding member arranged around the second boss and between the second member and the base portion, the second member is held while being overlapped with the first member, and a second male screw portion inserted into a second of the small diameter holes and extending from the second small diameter hole to the base portion side is screwed into the second boss.

2. The member attachment structure according to claim 1, wherein the holding member has an annular shape and is fitted to the second boss.

3. The member attachment structure according to claim 1, wherein the tip end portion of the second boss is fitted to the large diameter hole.

* * * * *